United States Patent [19]

Sugihara

[11] Patent Number: 5,757,785
[45] Date of Patent: May 26, 1998

[54] MULTI-DIRECTIONAL MULTIPLE ACCESS COMMUNICATION SYSTEM

[75] Inventor: Shigeru Sugihara, Tokyo, Japan

[73] Assignee: NEC Corporation, Japan

[21] Appl. No.: 593,665

[22] Filed: Jan. 29, 1996

[30] Foreign Application Priority Data

Feb. 1, 1995 [JP] Japan ................................. 7-015013

[51] Int. Cl.$^6$ ................................................. H04B 7/212
[52] U.S. Cl. ........................... 370/321; 370/347; 370/545
[58] Field of Search ................................ 370/315, 321, 370/322, 326, 347, 348, 442, 443, 468, 545; 455/53.1, 54.1, 54.2, 450, 452

[56] References Cited

U.S. PATENT DOCUMENTS

| | | | |
|---|---|---|---|
| 4,888,767 | 12/1989 | Furuya et al. | 370/347 |
| 5,276,686 | 1/1994 | Ito | 370/347 |
| 5,511,068 | 4/1996 | Sato | 370/545 |

FOREIGN PATENT DOCUMENTS 59-2454  1/1984  Japan.

*Primary Examiner*—Benedict V. Safourek
*Attorney, Agent, or Firm*—Ostrolenk, Faber, Gerb & Soffen, LLP

[57] ABSTRACT

A multi-directional multiple access communication system includes a master station and subscriber stations including a specific subscriber station. The system performs communications using a demand assignment scheme in which time slots are assigned between the subscriber and master stations only when a call is generated by a subscriber station. The master station includes a first transmission/reception section, a rate conversion circuit, a second transmission/reception section, a memory, and a distribution circuit. The first transmission/reception section performs multi-directional multiple access communication of a time slot signal with each subscriber station excluding the specific subscriber station via a first transmission path. The rate conversion circuit converts a time slot signal into a signal having a transmission rate lower than that of the first transmission path. The second transmission/reception section transmits the converted signal to the specific subscriber station via a second transmission path. The memory stores the first maximum number of time slots which can be transmitted via the second transmission path. The distribution circuit distributes a signal corresponding to the second transmission path within the first maximum number of time slots which is set in the memory.

7 Claims, 6 Drawing Sheets

MULTI-DIRECTIONAL MULTIPLE ACCESS COMMUNICATION SYSTEM

BACKGROUND OF THE INVENTION

The present invention relates to a multi-directional multiple access communication system for performing communication control using a demand assignment scheme in which time slots are assigned between a subscriber station and a master station between which a call is generated.

In general, a multi-directional multiple access communication system of this type is designed such that one-to-N communication is performed between one master station and a plurality of subscriber stations geographically isolated and dispersed therearound. Such a system is disclosed in, e.g., Japanese Patent Laid-Open No. 59-2454. In this system, when communication information is to be transferred from the master station to each subscriber station in the downward direction, predetermined communication information is transmitted to each subscriber station by using a time-division multiplex (TDM) scheme, and each subscriber station extracts communication information directed thereto by selectively separating it. In transferring communication information from each subscriber station to the master station in the upward direction, each station transmits predetermined communication information to the master station by using a time division multiple access (TDMA) scheme in which each subscriber station transmits a transmission burst signal only in a predetermined time slot assigned to each subscriber station. The master station separates and extracts the pieces of communication information from the respective subscriber stations, thereby performing bidirectional communication.

FIG. 6 shows the arrangement of the conventional system described above. A switching unit 1 to which a plurality of wire terminals 1a, such as telephone sets, are connected is connected to a radio transceiver 4 via a controller 3. Subscriber stations 5-1 to 5-n are connected to the radio transceiver 4 via multi-directional multiple access radio channels. Of these subscriber stations, the subscriber station 5-n uses a channel from the radio transceiver 4 as an entrance channel, and is further connected to a plurality of subscriber stations 6 as stations of a lower rank via multi-directional multiple access channels each having a different frequency from that of the radio transceiver 4. The subscriber station 5-n will be referred to as the repeater station 5-n hereinafter.

The switching unit 1 performs switching connections for calls from the wire terminals 1a and transmits the signals (having undergone switching connection) via a radio transmission path. Since the number of channels in the radio transmission path is generally smaller than the number of connection destinations capable of switching connection, the number of lines capable of switching connection must be limited to the number of channels in the radio transmission path., i.e., line concentration must be performed. Upon performing this line concentration processing, the controller 3 performs TDMA control to transmit the signals to the subscriber stations 5-1 to 5-n by radio via the radio transceiver 4.

The radio transceiver 4 transmits the same information, as downward information, to all the subscriber stations 5-1 to 5-n. The transmission capacity is set in consideration of the busy hour (or peak) traffic of each of the subscriber stations 5-1 to 5-n. During signal transmission from the subscriber stations 5-1 to 5-n to the master station in the upward direction, each subscriber station outputs a signal, i.e., a burst signal, to time slots assigned to each subscriber station, as needed.

In the above conventional system, if another radio system is located near a radio channel transmitting in a specific direction, interference may be caused by that other radio system depending on its operating frequency. In this case, only the radio channel transmitting in that direction may not be used. For this reason, only the radio channel transmitting in the specific direction may be replaced with a wire transmission path to prevent interference from the other radio system. Since the wire transmission path is installed in place of the radio transmission path, the wire transmission path must meet the standards of the radio transmission path. The wire transmission path is required to transmit signals in only the specific direction, unlike the radio transmission path which is designed to transmit signals in all directions. For this reason, it suffices if the traffic on the wire transmission path is lower than that of the radio transmission path. However, since the wire transmission path is required to meet the standards of the radio transmission path, the system will suffer an economical disadvantage.

In addition, since a radio transceiver (not shown) in the repeater station 5-n which is connected to the entrance channel is lower in rank than the radio transceiver 4, the radio transceiver is designed such that the number of subscriber stations 6 connected to the repeater station 5-n is smaller than the number of subscriber stations connected to the radio transceiver 4. Furthermore, this radio transceiver is designed to have a smaller busy hour traffic characteristic and a smaller number of time slots than the radio transceiver 4. If, therefore, the entrance channel is replaced with a wire transmission path, and the number of time slots in the wire transmission path is larger than the number of subscriber stations 6, mismatching occurs in terms of the number of time slots. As a result, calls cannot be connected to the subscriber stations 6 via the wire transmission path.

SUMMARY OF THE INVENTION

It is an object of the present invention to provide an economical multi-directional multiple access communication system.

It is another object of the present invention to provide a multi-directional multiple access communication system which can prevent mismatching in terms of the number of time slots.

In order to achieve the above objects, according to the present invention, there is provided a multi-directional multiple access communication system comprising a master station as an upper station and a plurality of subscriber stations as lower stations including a specific subscriber station, the system performing communication by a demand assignment scheme in which only when a call is generated by a subscriber station, time slots are assigned between the subscriber station and the master station, the master station including first transmission means for performing multi-directional multiple access communication of a time slot signal with each of the subscriber stations excluding the specific subscriber station via a first transmission path, first rate conversion means for converting a time slot signal into a signal having a transmission rate lower than that of the first transmission path, second transmission means for transmitting the converted signal from the rate conversion means to the specific subscriber station via a second transmission path, memory means in which a first maximum number of time slots which can be transmitted via the second transmission path is set, and signal distribution means for distributing a signal corresponding to the second transmission path within the first maximum number of time slots which is set in the memory means.

BRIEF DESCRIPTION OF THE DRAWINGS

FIGS. 4A to 4E are timing charts showing the exchange of signals with respect to wire subscriber stations in the downward direction;

FIGS. 5A to 5H are timing charts showing the exchange of signals with respect to the wire subscriber stations in the upward direction.

DESCRIPTION OF THE PREFERRED EMBODIMENT

Figure 1:
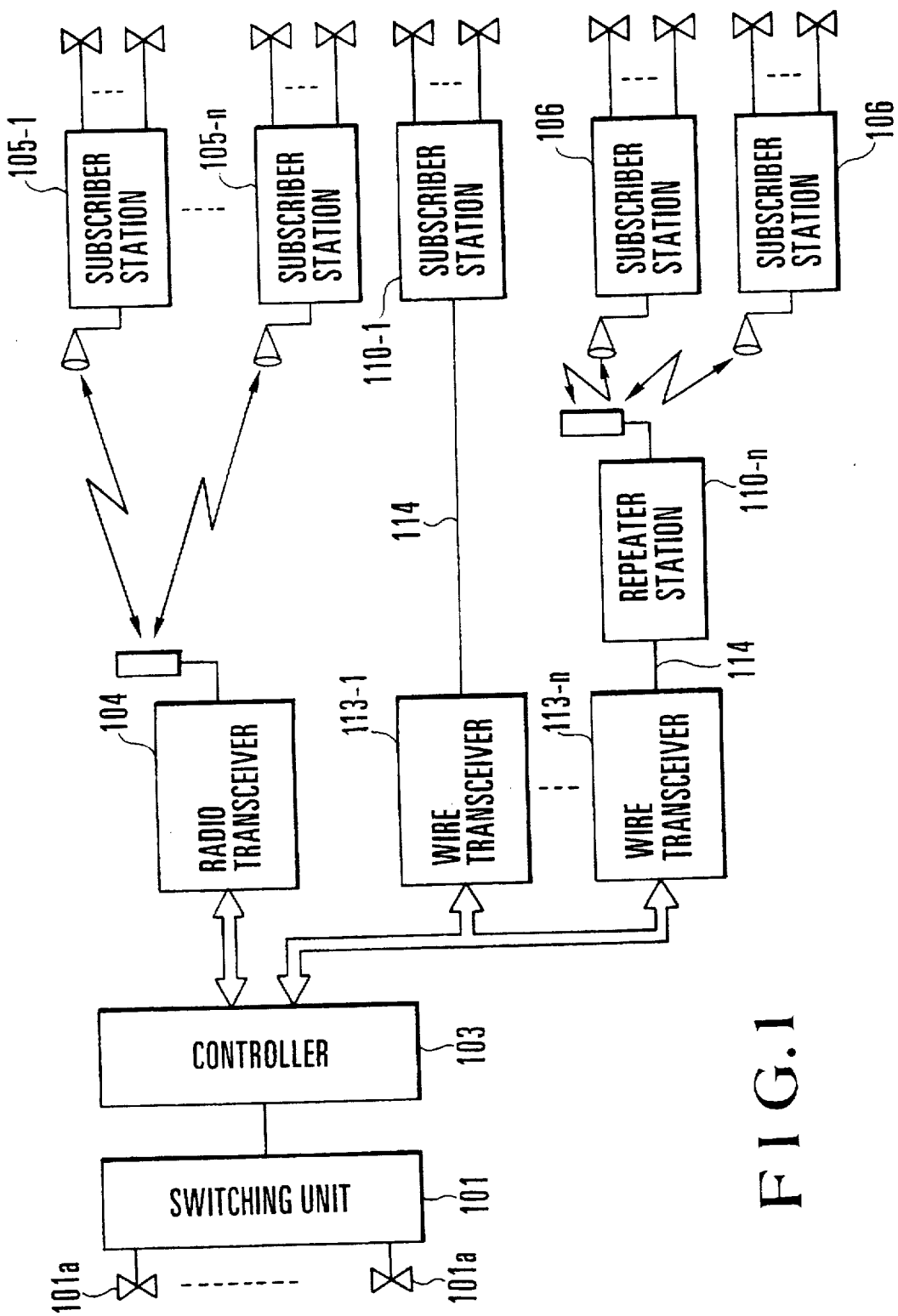
FIG. 1 is a block diagram showing a multi-directional multiple access communication system according to an embodiment of the present invention.

FIG. 1 shows an embodiment of the present invention. Referring to FIG. 1, a plurality of wire terminals 101a such as telephone sets are connected to a switching unit 101, and a radio transceiver 104 is connected to the switching unit 101 via a controller 103. Radio subscriber stations 105-1 to 105-n are connected to the radio transceiver 104 via multi-directional multiple access radio channels. Wire transceivers 113-1 to 113-n are connected to the controller 103. Wire subscriber stations 110-1 to 110-n are connected to the wire transceivers 113-1 to 113-n via wire transmission paths 114. The wire subscriber station 110-n uses the wire transmission path 114 from the wire transceiver 113-n as an entrance line which is a repeater line. The wire subscriber station 110-n is also connected to a plurality of subscriber stations 106 as stations of a lower rank via multi-direction multiplex radio channels each having a frequency different from that of the radio transceiver 104. The wire subscriber station 110-n will be referred to as the repeater station 110-n hereinafter.

The switching unit 101 performs switching connections for calls from the wire terminals 101a and transmits the signals (having undergone switching connection) via radio and wire transmission paths. In transmitting information via the radio transmission path, since the number of channels in the radio transmission path is generally smaller than the number of connection destinations capable of switching connection, the number of lines subjected to switching connection must be limited to the number of channels in the radio transmission path, i.e., line concentration must be performed. Upon performing this line concentration processing, the controller 103 performs TDMA control to transmit the signals to the radio subscriber stations 105-1 to 105-n by radio via the radio transceiver 104.

The radio transceiver 104 transmits the same information, as downward information, to all the subscriber stations 105-1 to 105-n. The transmission capacity is set in consideration of the busy hour (peak) traffic of each of the subscriber stations 105-1 to 105-n. In signal transmission from the subscriber stations 105-1 to 105-n to the master station in the upward direction, each subscriber station outputs a signal, i.e., a burst signal, to time slots assigned to each subscriber station, as needed.

In transmitting information to the entrance line, the wire transmission path 114 having a capacity conforming to the traffic in the corresponding direction is used. A signal output from the controller 103 is converted into a signal with a transmission rate conforming to the capacity of the wire transmission path 114 and is transmitted from one of the wire transceivers 113-1 to 113-n. In order to perform transmission rate conversion, the corresponding wire transceiver performs frame conversion and transmits the converted signal to the wire transmission path 114. Similarly, each of the wire subscriber stations 110-1 to 110-n has a rate conversion function conforming to the transmission rate of each of the wire transceivers 113-1 to 113-n.

The repeater station 110-n is connected to the subscriber stations 106 via the multi-directional multiple access radio channels, and the number of time slots in the radio channels from the repeater station 110-n to the subscriber stations 106 is set to be smaller than that in the wire transmission paths 114. That is, a plurality of telephone sets (not shown) to be terminated by the repeater station 110-n are connected thereto, and the traffic of the wire transmission path 114 to the repeater station 110-n is designed to handle both the traffic of each terminated telephone unit and the traffic of each subscriber station 106.

Figure 2:
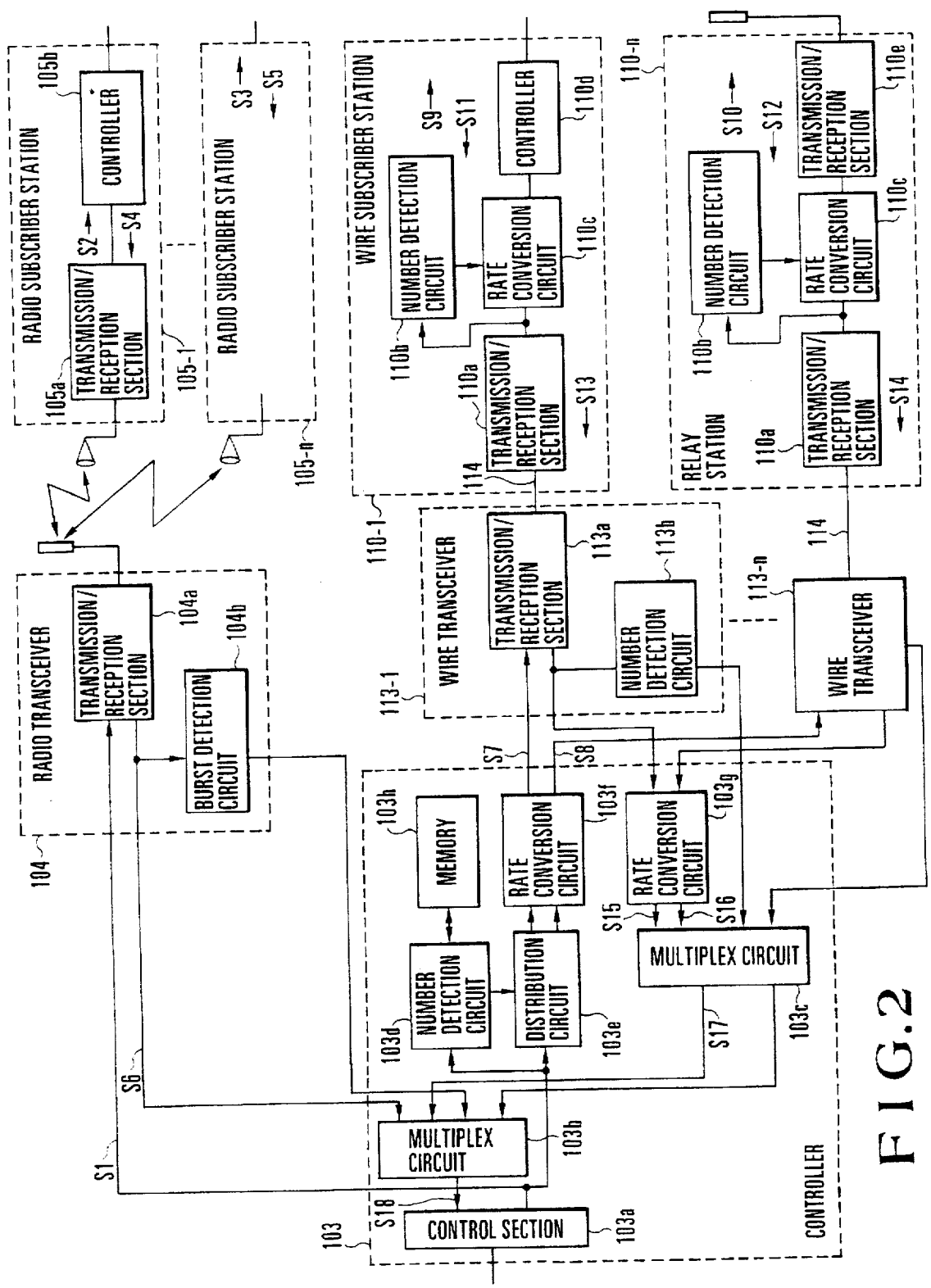
FIG. 2 is a block diagram showing the main part of the system in FIG. 1 in detail.

FIG. 2 shows the main part of the system in FIG. 1. Referring to FIG. 2, the controller 103 comprises a control section 103a for performing TDMA control, multiplex circuits 103b and 103c for performing multiplex processing of signals, a number detection circuit 103d for detecting the subscriber station number of each of the wire subscriber stations 110-1 to 110-n, a distribution circuit 103e for distributing a signal to the wire transmission path 114 in the direction corresponding to the detected subscriber station number, a rate conversion circuit 103f for converting the signal rate from the transmission rate of the radio transmission path to that of the wire transmission path 114, a rate conversion circuit 103g for converting the signal rate from the transmission rate of the wire transmission path 114 to that of the radio transmission path, and a memory 103h (to be described later).

The radio transceiver 104 comprises a transmission/reception section 104a and a burst detection circuit 104b for detecting a burst signal from each of the radio subscriber stations 105-1 to 105-n. Each of the wire transceivers 113-1 to 113-n comprises a transmission/reception section 113a connected to the wire transmission path 114, and a number detection circuit 113b for detecting the subscriber station number and time slot number of a corresponding one of the wire subscriber stations 110-1 to 110-n. Each of the radio subscriber stations 105-1 to 105-n comprises a transmission/reception section 105a for transmitting/receiving signals via the radio transmission path, and a controller 105b for performing TDMA control. Each of the wire subscriber stations 110-1 to 110-n comprises a transmission/reception section 110a connected to the wire transmission path 114, a number detection circuit 110b for detecting a time slot number, a rate conversion circuit 110c for performing signal rate conversion, and a controller 110d for performing TDMA control.

The system having the above arrangement operates as follows. Signal transmission performed by the radio subscriber stations in the downward and upward directions will be described first with reference to FIGS. 3A to 3F.

Figure 3A:
FIGS. 3A to 3F are timing charts showing the exchange of signals with respect to radio subscriber stations in the downward and upward directions.

As shown in FIG. 3A, signal S1 supplied from the control section 103a of the controller 103 to the radio transceiver 104 is constituted by a control signal time slot C and time slots #1 to #8 following the control time slot C. Note that time slots to be used are not limited to the time slots #1 to #8. The signals in time slots #1 to #8 are simultaneously transmitted from the transmission/reception section 104a of the radio transceiver 104 to all the radio subscriber stations 105-1 to 105-n. Each of the radio subscriber stations 105-1 to 105-n receives the signal in one of time slots #1 to #8 which is assigned to each subscriber station.

Figure 3B:
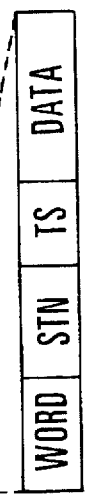

As shown in FIG. 3B, each of the signals in time slots #1 to #8 includes word, STN, TS, and data signals. The word signal is a signal for allowing the subscriber station to identify multi-directional multiple access communication. The STN signal is a signal indicating a subscriber station number. The TS signal represents a time slot number. The data signal is a main signal. The radio subscriber station 105-1 uses time slot #3, and the radio subscriber station 105-n uses time slot #1. In addition, downward and upward signals in the radio subscriber station 105-1 are respectively denoted by reference symbols S2 and S4, whereas downward and upward signals in the radio subscriber station 105-n are respectively denoted by reference symbols S3 and S5.

An upward signal from each of the radio subscriber stations 105-1 to 105-n is received by the transmission/reception section 104a of the radio transceiver 104 and supplied to the multiplex circuit 103b of the controller 103. The burst detection circuit 104b of the radio transceiver 104 detects a burst signal from a corresponding one of the radio subscriber stations 105-1 to 105-n, i.e., a time slot number from the radio subscriber station, together with a signal representing a subscriber station number, and supplies the detected signals to the multiplex circuit 103b.

Figure 3C:
Figure 3D:
Figure 3E:
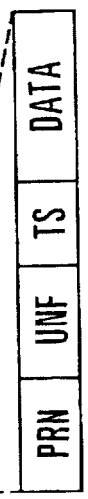

FIG. 3C shows an upward signal from the radio subscriber station 105-1. The signal S4 from the radio subscriber station 105-1 is output to time slot #3 following the control signal time slot C. FIG. 3D shows an upward signal from the radio subscriber station 105-n. The signal S5 from the radio subscriber station 105-n is output to time slot #1 following the control signal time slot C. As shown in FIG. 3E, a burst signal from each of the radio subscriber stations 105-1 to 105-n in the upward direction includes PRN, UNF, TS, and data signals. The PRN signal is a principle signal for clock extraction. The UNF signal is a signal representing a uni-flag and contains a subscriber station number. The TS signal is a signal representing a time slot number. The data signal is a main signal.

Figure 3F:
Figure 6:
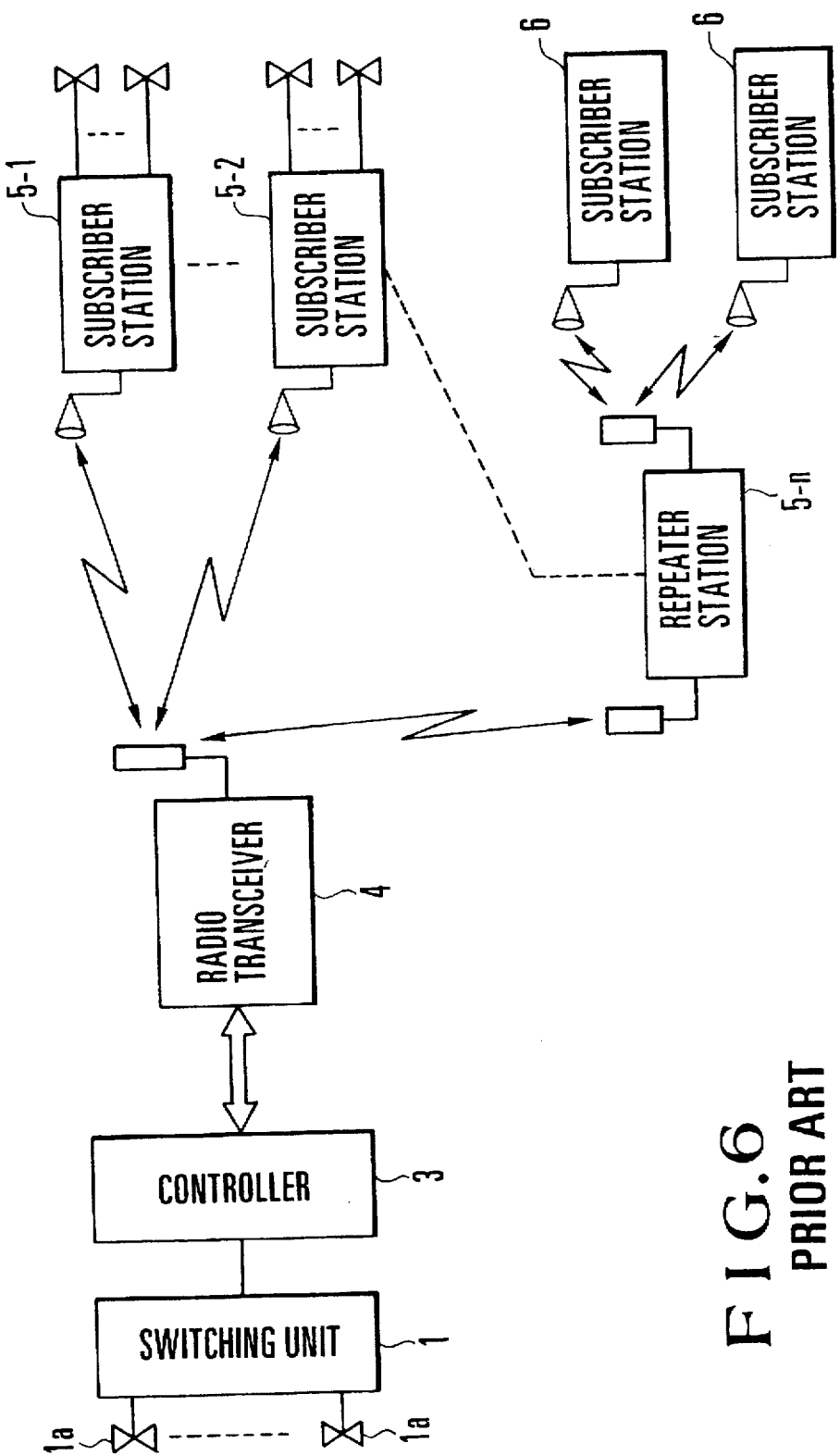
FIG. 6 is a block diagram showing a conventional multi-directional multiple access communication system.

The signals in time slots #1 and #3 in FIGS. 3C and 3D are supplied, as a signal S6, to the multiplex circuit 103b, as shown in FIG. 3F. The multiplex circuit 103b supplies the output signal S6 from the transmission/reception section 104a to the control section 103a on the basis of the signal detected by the burst detection circuit 104b. The control section 103a performs TDMA control to supply the signal S6 to the switching unit 1 (FIG. 1).

FIGS. 4A to 4E show signal transmission in the wire subscriber stations 110-1 to 110-n in the downward direction. A signal S1 for delivery to each wire subscriber station is supplied from the control section 103a to the distribution circuit 103e and the number detection circuit 103d. The number detection circuit 103d detects a time slot number and a subscriber station number contained in each time slot, and controls the distribution circuit 103e in accordance with the detection result. The distribution circuit 103e outputs each signal supplied from the control section 103a to a corresponding one of the wire transceivers 113-1 to 113-n in a corresponding direction. Note that each signal output from the distribution circuit 103e undergoes rate conversion in the rate conversion circuit 103f to conform to the transmission rate of the wire transmission path 114.

Signal transmission via each radio transmission path must be performed in consideration of the overall busy hour traffic of the system. In contrast, it suffices if each wire transmission path 114 can ensure the busy hour traffic of a corresponding wire subscriber station. For this reason, the transmission rate of each wire transmission path may be lower than that of each radio transmission path. Of time slots #1 to #8 in FIG. 4A, time slots #3, #7, and #8 are used by the wire subscriber station 110-1, and time slots #5 and #6 are used by the repeater station 110-n. That is, the transmission rate of signals transmitted to the wire transmission path 114 may be set such that at least three time slots are transmitted until the signal S1 circulates once, i.e., in the time interval between the instant at which time slot #1 is generated and the instant at which time slot #1 is generated again.

The rate conversion circuit 103f of the controller 103 performs rate conversion of the signal S1 from the distribution circuit 103e, and transmits the signals in time slots #4, #7, and #8 following a control signal time slot C, as a signal S7, to the wire transceiver 113-1 to which the wire subscriber station 110-1 is connected, as shown in FIG. 4B. In addition, the rate conversion circuit 103f transmits the signals in time slots #5 and #6 following the control signal C, as a signal S8, to the wire transceiver 113-n to which the repeater station 110-n is connected, as shown in FIG. 4C.

The signal S7, sent to the wire transmission path 114 via the transmission/reception section 113a of the wire transceiver 113-1, is received by the transmission/reception section 110a of the wire subscriber station 110-1, and is restored to the original rate by the rate conversion circuit 110c. Similarly, the signal S8, sent from the wire transceiver 113-n to the wire transmission path 114, is received by the transmission/reception section 110a of the wire subscriber station 110-n and is restored to the original rate by the rate conversion circuit 110c. Upon detection of a time slot number and a subscriber station number contained in the time slot, the number detection circuit 110b supplies only the time slot containing the detected subscriber station number to the controller 110d at the timing of the original time slot. As a result, a signal S9 from the wire subscriber station 110-1 is transmitted at time slots #4, #7, and #8 which are synchronized with time slots in the radio transmission path, as shown in FIG. 4D. A signal S10 from the repeater station 110-n is transmitted at time slots #5 and #6 which are synchronized with time slots in the radio transmission path, as shown in FIG. 4E.

The wire subscriber station 110-1 can perform communication coincident with time slots #4, #7, and #8, and the repeater station 110-n can perform communication coincident with time slots #5 and #6. The wire subscriber stations 110-1 to 110-n can therefore perform communication by the same time-division scheme as in a conventional case wherein subscriber stations are accommodated in a multi-directional multiple access system using radio transmission paths.

FIGS. 5A to 5H show the exchange of signals when the signals are transmitted from the wire subscriber stations 110-1 to 110-n in the upward direction. The wire subscriber stations 110-1 and 110-n transmit signals S11 and S12 in FIGS. 5A and 5B by using time slots #4 to #8. Time slots #4 to #8 are synchronous with time slots #4 to #8 in each radio transmission path.

As shown in FIGS. 5C and 5D, in the wire subscriber stations 110-1 and 110-n, the signals S11 and S12 are subjected to rate conversion in the rate conversion circuit 110c to conform to the transmission rate of the wire transmission path 114, and are transmitted, as signals S13 and S14, from the transmission/reception section 110a via the wire transmission paths 114. The signal S13 transmitted from the wire subscriber station 110-1 is received by the transmission/reception section 113a of the wire transceiver 113-1. Similarly, the signal S14 transmitted from the wire subscriber station 110-n is received by the wire transceiver 113-n. Note that the signals in FIGS. 5C and 5D have undergone changes in transmission rate, and hence are not synchronous with the time slots in the wire transmission path.

As shown in FIGS. 5E and 5F, the signals received by the wire transceivers 113-1 and 113-n are rate-converted into signals S15 and S16 in the same time slots as those in the radio subscriber station by the rate conversion circuit 103g of the controller 103. The rate-converted signals S15 and S16 are supplied to the multiplex circuit 103c. As shown in FIG. 5G, these signals are then transmitted, as a signal S17, from the multiplex circuits 103b and 103c at the timing of the corresponding subscriber station on the basis of the time slot and the subscriber station number detected by the number detection circuit 113b. The multiplex circuit 103b multiplexes the signal S17 from the multiplex circuits 103b and 103c and the signal supplied from the radio transceiver 104, and supplies the resultant signal, as a signal S18 in FIG. 5H, to the control section 103a. The control section 103a performs TDMA control for the signal S18 from the multiplex circuits 103b and 103c.

Each subscriber station 106 has the same arrangement as that of each of the radio subscriber stations 105-1 to 105-n, and performs transmission/reception processing and a control operation in the same manner as in each radio subscriber station. However, each of the radio subscriber stations 105-1 to 105-n is higher in rank than each subscriber station 106, and hence can use all the time slots secured by the radio transceiver 104 (i.e., has the right to use). In contrast, each subscriber station 106 is lower in rank than each of the radio subscriber stations 105-1 to 105-n, and hence has a traffic smaller than that of each radio subscriber station. For this reason, the repeater station 110-n cannot use all the time slots ensured by the radio transceiver 104. If, therefore, the number of time slots used by the wire subscriber stations 110-1 to 110-n is represented by m, the number n of time slots used by the subscriber stations 106 is smaller than the number m, i.e., m>n.

No problem is posed in communication in the upward direction because only a station which generates a call occupies time slots under demand assignment control. In communication in the downward direction, however, the number of time slots in actual lines is smaller than the number of time slots managed by the control section 103a, so that some time slots cannot be connected to any connection destinations by the controller 103.

In order to prevent any such inconvenience, in this system, the memory 103h is incorporated in the controller 103 to limit the maximum number of time slots which can be used in accordance with subscriber station numbers detected by the number detection circuit 103d.

More specifically, if the detected subscriber station numbers correspond to the wire subscriber stations 110-1 to 110-n, the number of time slots in the wire transmission paths 114 secured by the wire transceivers 113-1 to 113-n is set to the maximum number of time slots. In contrast, if the detected subscriber station numbers correspond to the subscriber stations 106, the number of time slots secured by the repeater station 110-n is set to the maximum number of time slots. The repeater station 110-n is used as an entrance line for each subscriber station 106. In addition, there is a call terminated in the home terminal, i.e., the telephone set (not shown) finally connected to the repeater station 110-n. In this case, the total number of time slots terminated by the repeater station 110-n and used by each subscriber station 106 is the maximum number of time slots which can be used.

If the repeater station 110-n uses all the maximum number of time slots, each subscriber station 106 can use no time slot because no time slot is assigned thereto. However, since the probability that the repeater station 110-n uses all the maximum number of time slots is very low, if the number of time slots is determined in accordance with the traffic, the probability of the above inconvenience can be reduced. Alternatively, the repeater station 110-n may have a function of detecting time slots which can be used. If no time slot which can be used is detected, a signal indicating that all the time slots are in use may be sent to each subscriber station 106.

In the above embodiment, pieces of information of a subscriber station number and a time slot number are multiplexed with a time slot for transmitting a main signal from each subscriber station. However, these pieces of information can be transmitted after they are multiplexed with a control signal time slot.

In addition, in the above embodiment, each wire station performs rate conversion to make the TDMA technique in each wire subscriber station conform to that in each radio subscriber station so that the hardware and the software may be shared. If, however, they need not be shared, rate conversion in each wire subscriber station may be omitted.

In this embodiment, the wire transmission paths are used as transmission paths each having a transmission rate different from that of each of the multi-directional transmission paths. However, radio transmission paths each having a frequency different from that of each of the multi-directional transmission paths may be used.

As has been described above, according to the present invention, rate conversion is performed such that the transmission rate in a second path as a predetermined path of the first paths as the multi-directional paths from the master station to the subscriber stations is set to be lower than that in each multi-directional path, thereby transmitting a signal via the transmission path different from the multi-directional paths. Time slots are not distributed to the second path beyond the maximum number of time slots which can be used in the second path. Even if, therefore, the second path is geographically associated with another radio system to be interfered, a call in the second path can be saved, and mismatching in terms of time slots can be prevented.

A second path is used as an entrance line, and a third path, to which a smaller number of time slots which can be used than that in the second path are assigned, is arranged to extend from the second path. The time slots used in the third path are limited by the maximum number of times slots in the third path. Even if, therefore, the second path is geographically associated with another radio system to be interfered, a call in the second path can be saved, and mismatching in terms of time slots can be prevented.

What is claimed is:

1. A multi-directional multiple access communication system comprising:

a master station as an upper station;

a plurality of subscriber stations as lower stations including a specific subscriber station, said master station having from one to N communications with said subscriber stations;

said system being adapted to perform communications using a demand assignment scheme in which time slots are assigned between said subscriber stations and said master station only when a call is generated by a subscriber station, said master station including:

a first transmission circuit adapted to perform multi-directional multiple access communication using time slots with each of said subscriber stations excluding said specific subscriber station via a first transmission path having a first transmission rate;

a first rate conversion circuit adapted to convert a transmission rate of an input signal into a converted signal having a second transmission rate which is lower than the first transmission rate;

a second transmission circuit adapted to transmit said converted signal from said first rate conversion circuit to said specific subscriber station via a second transmission path;

a memory being adapted to set a first maximum number of time slots which may be transmitted via said second transmission path; and a signal distribution circuit for distributing a signal corresponding to said second transmission path within said first maximum number of time slots of said memory to said first conversion circuit.

2. A system according to claim 1, wherein said specific subscriber station comprises a signal repeater circuit adapted to convert a signal transmitted from said second transmission circuit into a time slot signal and relaying said time slot signal to a third transmission path, said memory being adapted to set a second maximum number of time slots which can be transmitted via said third transmission path which is smaller than said first maximum number of time slots, and said signal distribution circuit being adapted to distribute a signal corresponding to said third transmission path within said second maximum number of time slots.

3. A system according to claim 2, wherein said signal repeater circuit comprises:

a third transmission circuit adapted to perform signal transmission with said second transmission circuit;

a second rate conversion circuit adapted to convert a transmission rate of a signal from said third transmission circuit into a time slot signal;

a number detection circuit adapted to detect a time slot number and a subscriber station number from said signal from said third transmission means; and a transmission control circuit adapted to perform transmission control corresponding to said time slots of a corresponding subscriber station as a station of a lower rank on the basis of said time slot number and said subscriber station number from said number detection circuit.

4. A system according to claim 1, wherein said master station comprises:

a second rate conversion circuit adapted to convert a converted signal transmitted from said specific subscriber station via said second transmission path into a time slot signal, said converted signal from said specific subscriber station having a transmission rate lower than the transmission rates of signals on said first transmission path;

a number detection circuit adapted to detect a time slot number and a subscriber station number of said converted signal transmitted via said second transmission path; and a multiplex circuit adapted to perform signal multiplexing corresponding to said time slots of a corresponding subscriber station on the basis of said time slot number and said subscriber station number from said number detection circuit.

5. A system according to claim 1, wherein said second transmission path is a wire transmission path having less traffic than said first transmission path, said first rate conversion circuit being adapted to convert a transmission rate of a time slot signal into a signal having a transmission rate conforming to said wire transmission path.

6. A multi-directional multiple access communication system comprising:

a master station as an upper station;

a plurality of subscriber stations as lower stations, said master station having from one to N communications with said subscriber stations;

said system performing communications using a demand assignment scheme in which time slots are assigned between said subscriber stations and said master station only when a call is generated by a subscriber station, wherein rate conversion is performed such that a transmission rate of a second route is set to be lower than that of a first route which includes a multi-directional route from said master station to each of said subscriber stations, a signal is transmitted to the second route via a transmission path different from said multi-directional route, and time slots are not distributed to the signal to the second route beyond the maximum number of time slots which can be used therein.

7. A system according to claim 6, wherein said second route is used as an entrance line to a signal repeater, a third route in which said number of slots which can be used is smaller than that in said second route is arranged to extend from said entrance line of said signal repeater, and time slots are not distributed to a signal to said third route beyond said maximum number of time slots which can be used therein.

* * * * *